(12) United States Patent
Horn et al.

(10) Patent No.: US 10,939,280 B2
(45) Date of Patent: Mar. 2, 2021

(54) OPTIMIZATION OF USER EQUIPMENT RADIO CAPABILITY SIGNALING

(71) Applicant: QUALCOMM Incorporated, San Diego, CA (US)

(72) Inventors: Gavin Bernard Horn, La Jolla, CA (US); Haris Zisimopoulos, London (GB); Masato Kitazoe, Hachiouji (JP); Aziz Gholmieh, Del Mar, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/373,451

(22) Filed: Apr. 2, 2019

(65) Prior Publication Data

US 2019/0313239 A1    Oct. 10, 2019

Related U.S. Application Data

(60) Provisional application No. 62/653,367, filed on Apr. 5, 2018.

(51) Int. Cl.
*H04W 8/20* (2009.01)
*H04W 8/08* (2009.01)
(Continued)

(52) U.S. Cl.
CPC ............. *H04W 8/20* (2013.01); *H04L 5/14* (2013.01); *H04W 8/08* (2013.01); *H04W 88/10* (2013.01)

(58) Field of Classification Search
CPC .......... H04W 8/08; H04W 8/14; H04W 8/18; H04W 8/20; H04W 8/205; H04W 8/22;
(Continued)

(56) References Cited

U.S. PATENT DOCUMENTS 10,334,435 B2 *   6/2019   Lee ................... H04W 12/0013
2011/0176424 A1 *  7/2011  Yang .................. H04L 41/0803
                                                        370/236.2

(Continued)

FOREIGN PATENT DOCUMENTS

WO   2016055144 A1   4/2016
WO   2017052346 A1   3/2017
(Continued)

OTHER PUBLICATIONS

International Search Report and Written Opinion—PCT/US2019/025627—ISA/EPO—dated Jun. 11, 2019.
(Continued)

*Primary Examiner* — Kevin D Mew
(74) *Attorney, Agent, or Firm* — Patterson + Sheridan, L.L.P.

(57) ABSTRACT

Techniques for optimizing user equipment radio capability signaling for wireless communications are described. In one technique, a type of network to access for communications is determined. A capability identifier(s) associated with a set(s) of user equipment (UE) radio capabilities is determined based, at least in part, on the type of network. The capability identifier(s) is sent to the network. Upon receiving an indication of the capability identifier(s), the set(s) of UE radio capabilities associated with the capability identifier(s) is identified and stored.

28 Claims, 11 Drawing Sheets

(51) Int. Cl.
  *H04L 5/14* (2006.01)
  *H04W 88/10* (2009.01)
(58) Field of Classification Search
  CPC ....... H04W 8/24; H04W 8/245; H04W 88/10; H04L 5/14
  See application file for complete search history.

(56) References Cited

U.S. PATENT DOCUMENTS

| | | | |
|---|---|---|---|
| 2011/0216719 A1* | 9/2011 | Faurie | H04W 8/24 370/329 |
| 2011/0217980 A1* | 9/2011 | Faurie | H04W 60/00 455/435.1 |
| 2012/0020231 A1* | 1/2012 | Chen | H04W 24/08 370/252 |
| 2014/0204927 A1* | 7/2014 | Horn | H04W 8/06 370/338 |
| 2015/0208456 A1* | 7/2015 | Guo | H04W 76/14 455/426.1 |
| 2016/0007389 A1* | 1/2016 | Shalev | H04W 76/10 370/338 |
| 2017/0318463 A1* | 11/2017 | Lee | H04W 12/04033 |
| 2017/0332302 A1* | 11/2017 | Ercan | H04W 36/30 |
| 2017/0332303 A1* | 11/2017 | Sunay | H04W 36/00837 |
| 2018/0084539 A1* | 3/2018 | Kubota | H04W 76/15 |
| 2018/0160253 A1* | 6/2018 | Ahluwalia | H04W 8/22 |
| 2018/0227904 A1* | 8/2018 | Raghunathan | H04W 72/048 |
| 2018/0242319 A1* | 8/2018 | Akkarakaran | H04W 72/042 |
| 2018/0262905 A1* | 9/2018 | Dhanapal | H04W 8/24 |
| 2018/0270666 A1* | 9/2018 | Lee | H04W 12/08 |
| 2019/0037518 A1* | 1/2019 | Russell | H04W 8/24 |

FOREIGN PATENT DOCUMENTS

| | | |
|---|---|---|
| WO | 2017078580 A1 | 5/2017 |
| WO | 2018031846 A1 | 2/2018 |

OTHER PUBLICATIONS

NTT Docomo et al., "UE Capability Retrieval Framework in NR", 3GPP Draft; 3GPP TSG-RAN WG2#101, R2-1803716_UE Capability Retrieval in NR, 3rd Generation Partnership Project (3GPP), Mobile Competence Centre, 650, Route Des Lucioles, F-06921 Sophia-Antipolis Cedex, France, vol. Ran WG2, No. Athens, Greece, Feb. 26, 2018-Mar. 2, 2018, Feb. 16, 2018 (Feb. 16, 2018), XP051400732, 4 Pages, Retrieved from the Internet:URL:http://www.3gpp.org/ftp/tsg%5Fran/WG2%5FRL2/TSGR2%5F101/Docs/ [retrieved on Feb. 16, 2018].

* cited by examiner

OPTIMIZATION OF USER EQUIPMENT RADIO CAPABILITY SIGNALING

CROSS-REFERENCE TO RELATED APPLICATION

This application claims the benefit of and priority to U.S. Provisional Patent Application No. 62/653,367, filed Apr. 5, 2018, which is assigned to the assignee hereof and hereby expressly incorporated by reference herein.

BACKGROUND

I. Field of the Disclosure

The present disclosure relates generally to wireless communication systems, and more particularly, to methods and apparatus for optimizing user equipment (UE) radio capability signaling for wireless communications.

II. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an evolved Node B (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio BS (NR NB), a network node, 5G NB, eNB, a Next Generation NB (gNB), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for optimizing UE radio capability signaling for wireless communications that may be performed, for example, by a UE. The method generally includes determining a type of a network to access for communications. The method also includes determining, based at least in part on the type of the network, at least one capability identifier associated with at least one set of UE radio capabilities for the type of the network. The method further includes sending the at least one capability identifier to the network.

Certain aspects of the present disclosure provide an apparatus, such as a UE, for optimizing UE radio capability signaling for wireless communications. The apparatus includes means for determining a type of a network to access for communications. The apparatus also includes means for determining, based at least in part on the type of the network, at least one capability identifier associated with at least one set of UE radio capabilities for the type of the network. The apparatus further includes means for sending the at least one capability identifier to the network.

Certain aspects of the present disclosure provide an apparatus, such as a UE, for optimizing UE radio capability signaling for wireless communications. The apparatus includes a transmitter, at least one processor, and a memory coupled to the at least one processor. The at least one processor is configured to determine a type of a network to access for communications, and determine, based at least in part on the type of the network, at least one capability identifier associated with at least one set of UE radio capabilities for the type of the network. The transmitter is configured to transmit the at least one capability identifier to the network.

Certain aspects of the present disclosure provide a computer readable medium having computer executable code stored thereon for optimizing UE radio capability signaling for wireless communications. The computer executable code generally includes code for determining a type of a network to access for communications. The computer executable code also includes code for determining, based at least in part on the type of the network, at least one capability identifier associated with at least one set of UE radio capabilities for the type of the network. The computer executable code further includes code for sending the at least one capability identifier to the network.

Certain aspects of the present disclosure provide a method for optimizing UE radio capability signaling for wireless communications that may be performed, for example, by a network entity. The method generally includes receiving an indication of at least one capability identifier from a UE. The at least one capability identifier is associated with at least one set of UE radio capabilities. The method also includes identifying the at least one set of UE radio capabilities associated with the at least one capability identifier. The method further includes storing the at least one set of UE radio capabilities associated with the at least one capability identifier.

Certain aspects of the present disclosure provide an apparatus, such as a network entity, for optimizing UE radio capability signaling for wireless communications. The apparatus generally includes means for receiving an indication of at least one capability identifier from a UE. The at least one capability identifier is associated with at least one set of UE radio capabilities. The apparatus also includes means for identifying the at least one set of UE radio capabilities associated with the at least one capability identifier. The apparatus further includes means for storing the at least one set of UE radio capabilities associated with the at least one capability identifier.

Certain aspects of the present disclosure provide an apparatus, such as a network entity, for optimizing UE radio capability signaling for wireless communications. The apparatus generally includes a receiver, at least one processor and a memory coupled to the at least one processor. The receiver is configured to receive an indication of at least one capability identifier from a UE. The at least one capability identifier is associated with at least one set of UE radio capabilities. The at least one processor is configured to identify the at least one set of UE radio capabilities associated with the at least one capability identifier, and store the at least one set of UE radio capabilities associated with the at least one capability identifier.

Certain aspects of the present disclosure provide a computer readable medium having computer executable code stored thereon for optimizing UE radio capability signaling for wireless communications. The computer executable code generally includes code for receiving an indication of at least one capability identifier from a UE. The at least one capability identifier is associated with at least one set of UE radio capabilities. The computer executable code also includes code for identifying the at least one set of UE radio capabilities associated with the at least one capability identifier. The computer executable code further includes code for storing the at least one set of UE radio capabilities associated with the at least one capability identifier.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
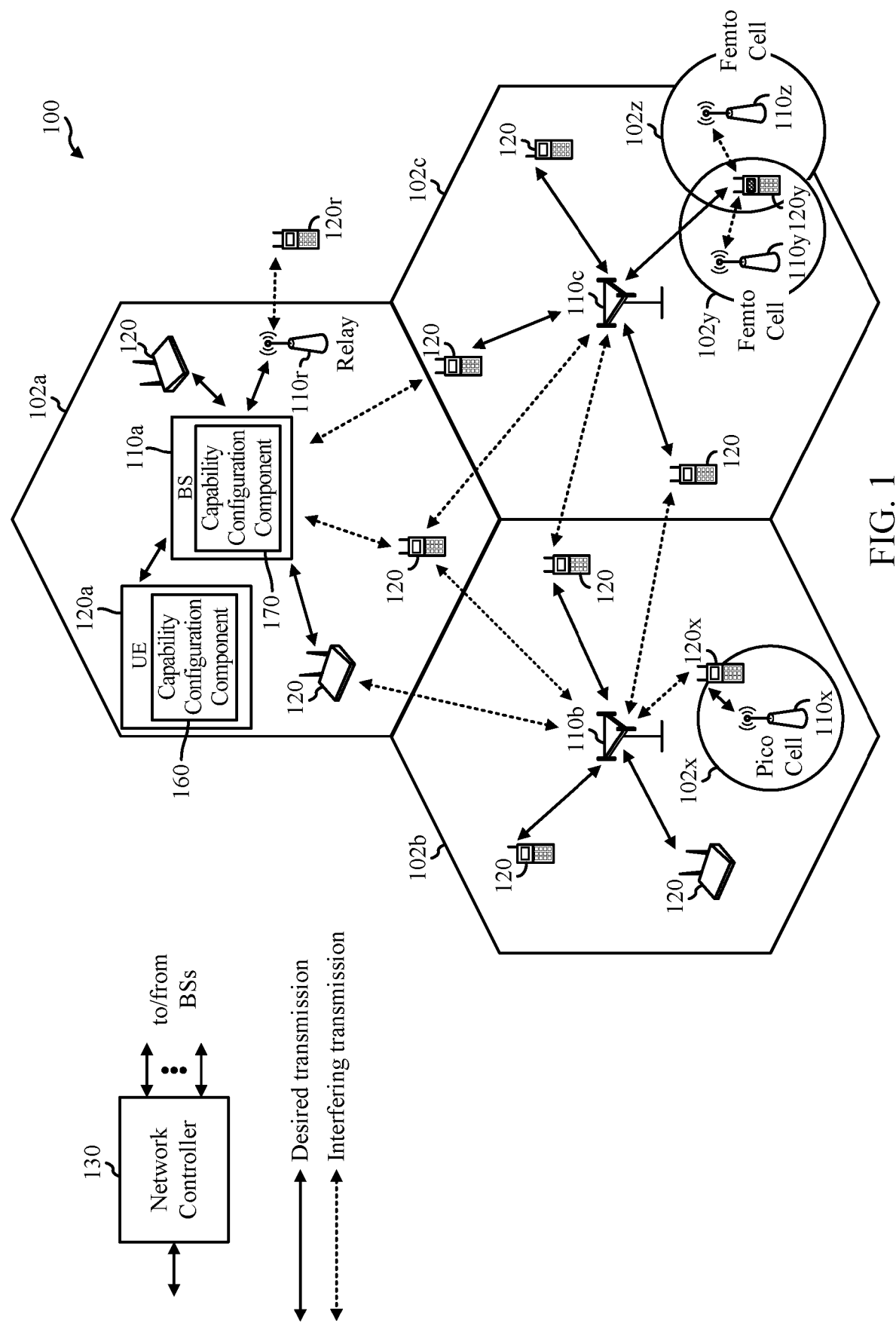
FIG. 1 is a block diagram conceptually illustrating an example telecommunications system, in accordance with certain aspects of the present disclosure.

Aspects of the present disclosure provide apparatus, methods, processing systems, and computer readable mediums for optimizing UE radio capability signaling within a wireless communication system (e.g., LTE system, NR system, etc.), e.g., to increase network throughput, improve efficiency, etc.

Wireless communication systems may support the exchange of UE capability information in the network, e.g., in order to provide the UE with communication services. The UE capability information may include information indicative of the radio access technologies (RATs) that the UE supports. Such information can include, for example, the power class, frequency bands, carrier aggregation (CA) band combinations, duplexing mode, traffic profile (e.g., voice centric, data centric, etc.), radio bearers, etc., supported by the UE.

In LTE, UE radio capabilities may be retrieved by the eNB using a UE capability enquiry procedure. However, during this procedure, the UE may send all of the UE radio capabilities, regardless of whether the UE has previously sent such capabilities and regardless of whether the UE may share the same set of capabilities with several other UEs. As the size of the UE capability information increases, this manner of sending UE capability information can significantly reduce network efficiency and impact network communications. In LTE, for example, the size of the UE capability information can be significantly large (e.g., greater than 50 octets). As UEs in NR may be expected to support different (and/or additional) capabilities (relative to LTE), the UE capability information is further expected to significantly increase in size (e.g., relative to LTE). Thus, it may be desirable for wireless communication systems, such as 5G NR systems, to optimize how UE radio capabilities are signaled in the network.

Aspects presented herein provide techniques and apparatus for optimizing the UE radio capability signaling (e.g., by reducing the size of UE radio capability signaling) for wireless communications.

In some aspects, a UE may determine a type of a network (e.g., radio access network (RAN), core network, etc.) to access for communications. For example, the UE may determine a type of RAT supported by the network, whether the network supports frequency division duplexing (FDD), time division duplexing (TDD), whether the network is a voice centric or data centric network, frequency band combinations supported by the network, etc. The UE may determine, based at least in part on the type of the network, at least one capability identifier associated with at least one set of UE radio capabilities for the type of the network. The UE may send the at least one capability identifier during a registration procedure with the network.

In this manner, the techniques presented herein can optimize the UE radio capability signaling in the network by enabling the UE to send a capability identifier that is associated with a particular set of UE radio capabilities, as opposed to sending the actual set of UE radio capabilities. This, in turn, can significantly reduce the size of the UE radio capability signaling in the network.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR introduces the concept of network slicing. For example, a network may have multiple slices, which may support different services, for example, internet of everything (IoE), URLLC, eMBB, vehicle-to-vehicle (V2V) communications, etc. A slice may be defined as a complete logical network that comprises of a set of network functions and corresponding resources necessary to provide certain network capabilities and network characteristics.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100, such as a NR or 5G network, in which aspects of the present disclosure may be performed, e.g., for optimizing UE radio capability signaling. As illustrated, a UE 120a includes a capability configuration component 160, which is configured to implement one or more techniques described herein for optimizing UE radio capability signaling. Using the capability configuration component 160, the UE 120a may determine a type of a network to access for communications and determine, based at least in part on the type of the network, at least one capability identifier associated with at least one set of UE radio capabilities for the type of the network. The UE 120a may send the at least one capability identifier during a registration procedure with the network.

As also illustrated, a BS 110a (e.g., network node) includes a capability configuration component 170, which is configured to implement one or more techniques described herein for optimizing UE radio capability signaling. Using the capability configuration component 170, the BS 110*a* may receive the at least one capability identifier from the UE and determine whether the BS 110*a* has the corresponding set of UE radio capabilities associated with the capability identifier. If the BS 110*a* determines that the corresponding set of UE radio capabilities have been stored, the BS 110*a* may retrieve the set of UE radio capabilities. If the BS 110*a* determines that the corresponding set of UE radio capabilities have not been stored, the BS 110*a* may trigger a procedure to obtain the corresponding set of UE radio capabilities (e.g., from the UE)) and store the corresponding set of UE radio capabilities associated with the capability identifier.

Note that FIG. 1 uses the BS 110*a* as a reference example of a network node that may use the capability configuration component 170 to implement one or more techniques described herein. In some aspects, the capability configuration component 170 may be used by any network node in the wireless communication network 100. In one example, the network node can include a radio access network (RAN) node, such as an eNB, gNB, etc. In another example, the network node can include a core network node, such as an access and mobility function (AMF), mobility management entity (MME), etc.

As illustrated in FIG. 1, the wireless communication network 100 may include a number of BSs 110 and other network entities. A BS may be a station that communicates with UEs. Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and eNB, NB, 5G NB, gNB, gNodeB, access point (AP), BS, NR BS, 5G BS, DU, carrier, or transmission reception point (TRP) may be used interchangeably. The NR system may also support eLTE eNBs, which are configured to provide connectivity (for UEs) to a 5G core network via a LTE RAN. In some examples, a cell may not necessarily be stationary, and the geographic area of the cell may move according to the location of a mobile BS. In some examples, the BSs may be interconnected to one another and/or to one or more other BSs or network nodes (not shown) in the wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BS for the femto cells 102*y* and 102*z*, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) or narrowband IoT (NB-IoT) devices. Some UEs may also be considered as eLTE UEs, which are able to connect to a 5G core network via an eLTE eNB in a LTE RAN.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, sub-bands, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using time division duplex (TDD). Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which may use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
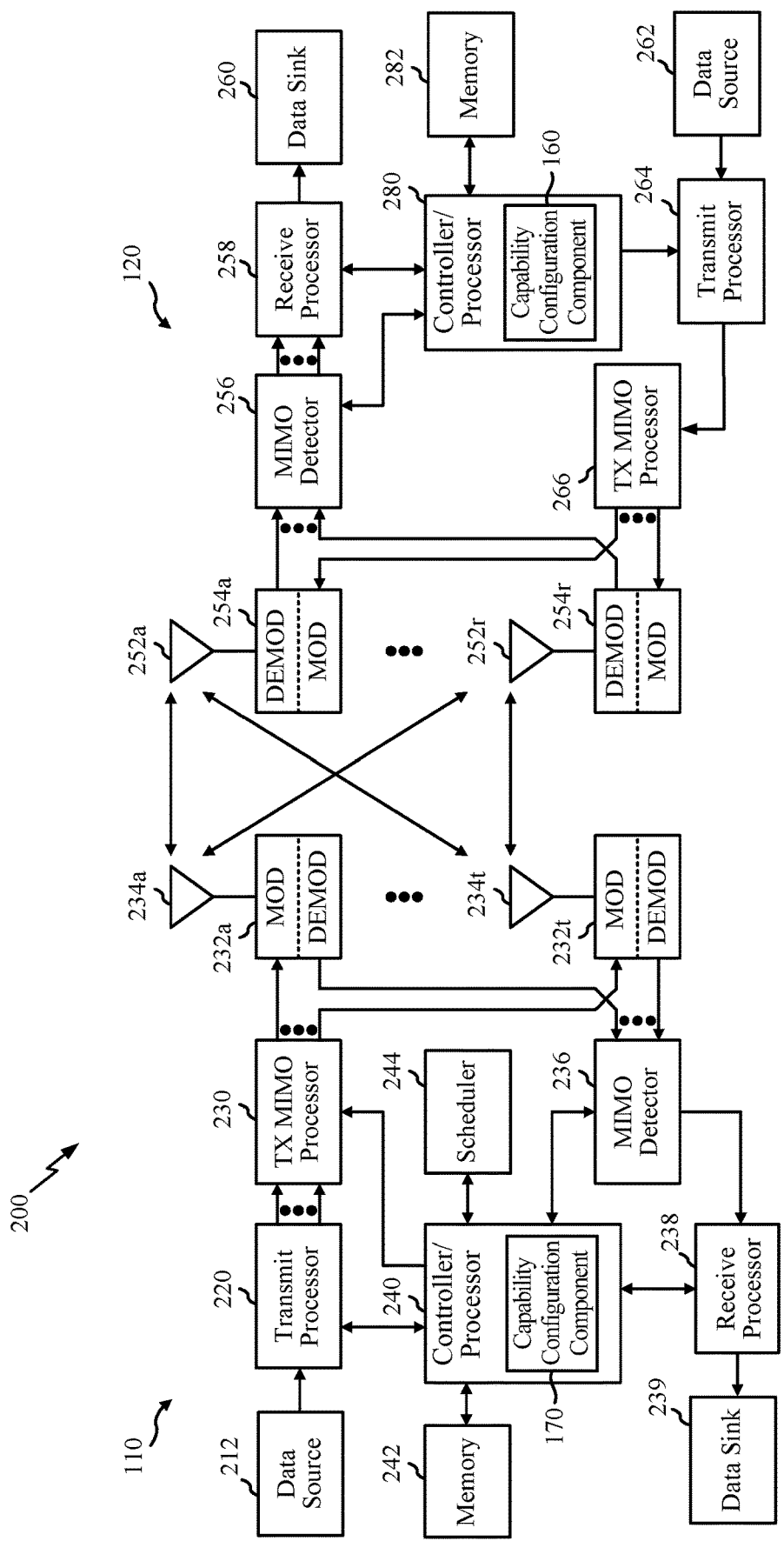
FIG. 2 is a block diagram illustrating an example architecture of a distributed radio access network (RAN), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. As shown in FIG. 2, the controller/processor 240 of the BS 110 has a capability configuration component 170 that may be configured for optimizing UE radio capability signaling for wireless communications, according to aspects described herein. Similarly, as shown in FIG. 2, the controller/processor 280 of the UE 120 has a capability configuration component 160 that may be configured for optimizing UE radio capability signaling for wireless communications, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of the functional blocks illustrated in FIG. 10, operations of gNB (and/or AMF) described in FIGS. 5-8 for optimizing UE radio capability signaling for wireless communications, and/or various processes for the techniques described herein. The controller/processor 280 and/or other processors and modules at the UE 120 may perform or direct the execution of the functional blocks illustrated in FIG. 9, operations of UE described in FIGS. 5-8 for optimizing UE radio capability signaling for wireless communications, and/or various processes for the techniques described herein. The memories 242 and 282 may store data and program codes for BS 110 and UE 120, respectively. A scheduler 244 may schedule UEs for data transmission on the downlink and/or uplink.

Figure 3:
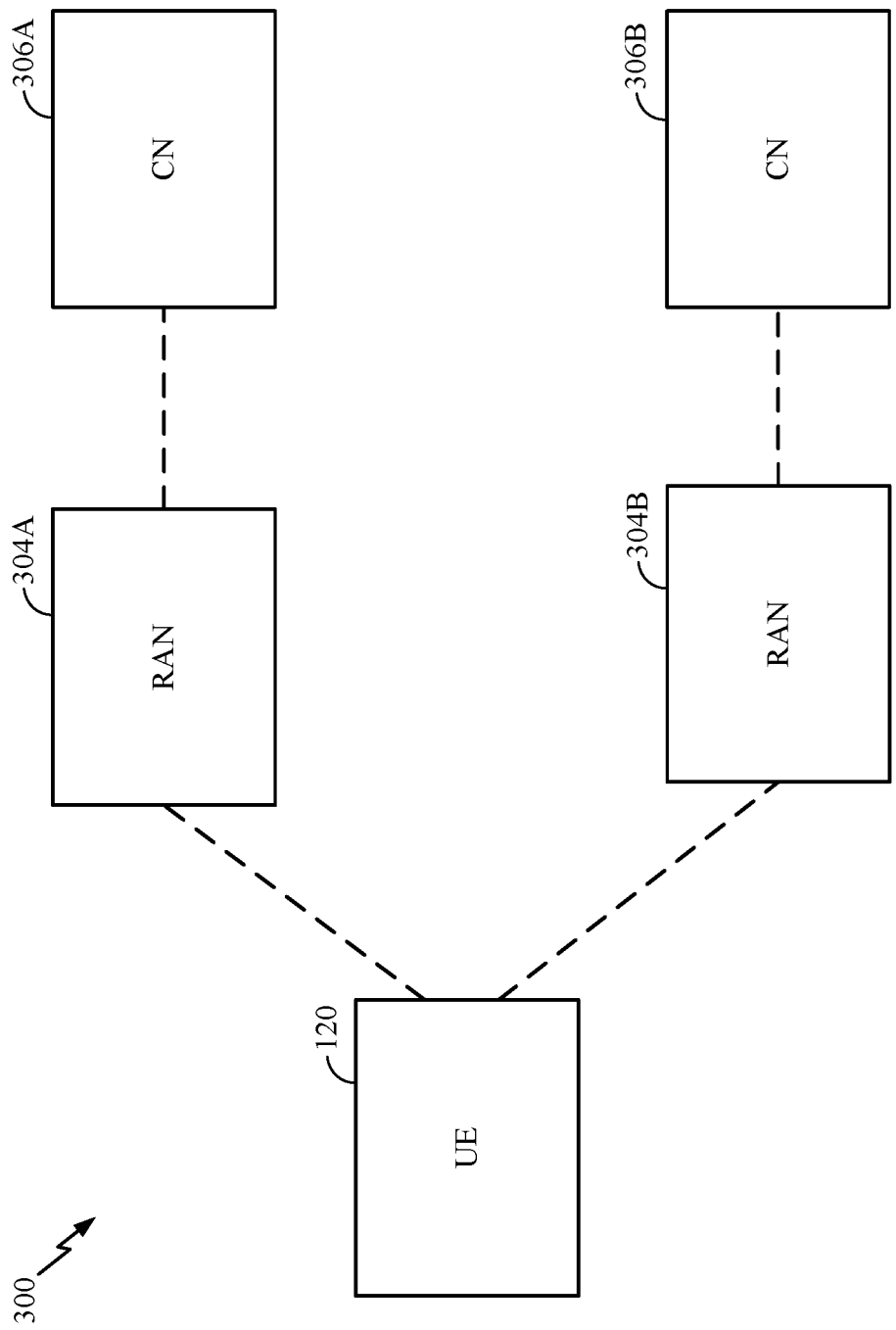
FIG. 3 illustrates an example system architecture for interworking between a 5G System (5GS) and an evolved universal mobile telecommunication system network (E-UTRAN) system, in accordance with certain aspects of the present disclosure.

FIG. 3 illustrates an example system architecture 300 for interworking between a 5G System (5GS) and E-UTRAN-EPC, in accordance with certain aspects of the present disclosure. As shown in FIG. 3, the UE 120 may be served by separate RANs 304A (e.g., E-UTRAN) and 304B (e.g., NR RAN) controlled by separate core networks (CNs) 306A (e.g., EPC) and 306B (e.g., 5GC), where the RAN 304A provides E-UTRA services and RAN 304B provides 5G NR services. The UE 120 may operate under only one RAN/CN or both RANs/CNs at a time.

The RANs/CNs in the system architecture 300 may include one or more network nodes that are configured to implement the techniques described herein for optimizing UE radio capability signaling. For example, the RANs/CNs may include network nodes that are configured with the capability configuration component 170. In RAN 304A, the network node(s) may include eNB(s), for example. In RAN 304B, the network nodes(s) may include gNB(s), for example. In CN 306A, the network node(s) may include MME(s), for example. In CN 306B, the network node(s) may include AMF(s), for example.

In some aspects, the set of UE radio capabilities may depend in part on the RAN/CN(s) the UE 120 is operating under. For example, at least one of the power class, frequency bands, band combinations, traffic profile, etc., may be different between RAN 304A/CN 306A and RAN 304B/CN306B. In some aspects, the capability configuration component 160 and/or the capability configuration component 170 may be configured to determine the capability identifier to use for signaling a set of UE radio capabilities based, at least in part, under which RAN/CN(s) the UE 120 is operating under.

In general, the UE 120 may perform a registration procedure (also referred to as network attachment) in order to access and receive services from a core network (e.g., CN 306A, CN 306B, etc.). The UE 120 may initiate the registration procedure by sending a registration request/attach request to the core network, e.g., via a non-access stratum (NAS) message. The registration request/attach request may include one or more parameters, such as the registration type, a UE identity (e.g., 5G globally unique temporary identity (5G-GUTI)), tracking area identity (TAI), requested network slice (e.g., requested network slice selection assistance information (NSSAI)), UE capabilities, etc. In some cases, the UE may participate in an exchange of NAS identity request/response messages with the core network, e.g., to inform the core network of the UE identity and other requested information.

As part of the registration procedure, the UE 120 may perform NAS level authentication and initiate ciphering for NAS messages with the core network, complete an access stratum (AS) security procedure with the RAN, and receive radio resource control (RRC) reconfiguration from the RAN. For example, the UE may receive an RRC reconfiguration message indicating a status of the registration procedure, a protocol data unit (PDU) session status, etc. The RRC reconfiguration message may also set up radio bearers for the UE, setup a secondary cell for the UE, initiate UE measurements, etc. The UE may confirm the successful completion of an RRC connection reconfiguration by sending an RRC reconfiguration complete message, and signal the completion of the registration procedure by sending a registration complete message to the core network, e.g., via a NAS message.

Example Optimization of UE Radio Capability Signaling

Figure 4:
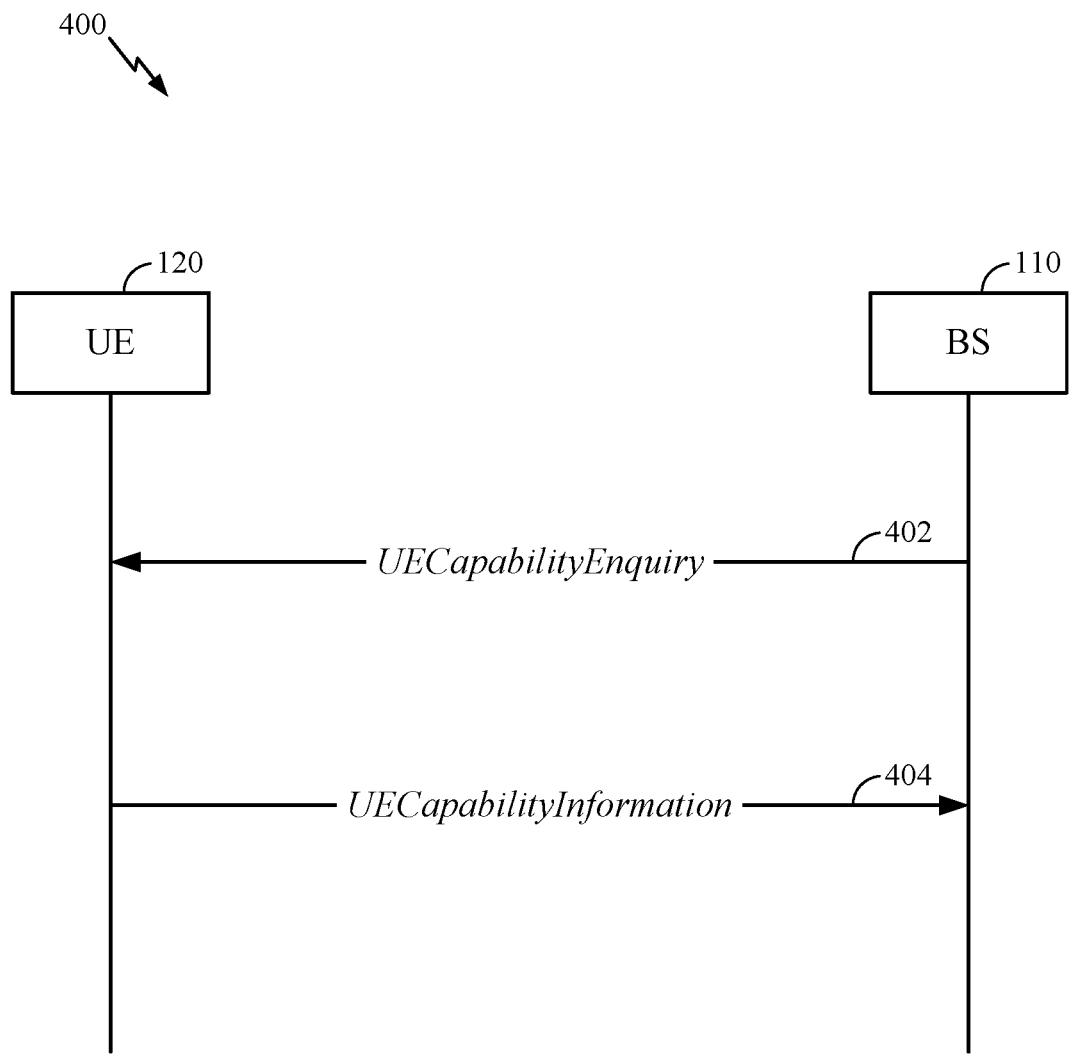
FIG. 4 is an example call flow for retrieving UE radio capabilities, in accordance with certain aspects of the present disclosure.

As noted, the UE radio capability information may include information regarding RATs supported by the UE. Such information can include, but is not limited to, power class, frequency bands, duplexing mode, traffic profile (e.g., voice centric, data centric, etc.), radio bearers, etc., supported by the UE. In general, the UE may report its UE radio access capabilities (which may be static) when requested by the network. As shown in FIG. 4, for example, the BS 110 may send a UE Capability Enquiry message to the UE 120

(402) and the UE 120, in response, may send a UE Capability Information message to the BS 110 (404). In some cases, the BS 110 can request what capabilities for the UE to report (e.g., similar to band and band combination requests in LTE). In the procedure 400 illustrated in FIG. 4, the size of the UE Capability Information message can be significantly large (e.g., greater than 50 octets) for some communication networks (e.g., LTE, NR). Sending UE capability information of such a large size can reduce network throughput and efficiency of network communications.

In addition, there may be some situations in which the UE participates in multiple procedures 400 to inform the network of its UE radio capabilities. For example, in some cases, the UE may change some of its UE radio capabilities. The change of UE radio capabilities may be to, temporarily (e.g., under network control), limit the availability of some capabilities, e.g., due to hardware sharing, interference or overheating. The temporary capability restriction may be transparent to the core network (e.g., NextGen (5G) Core). That is, the core network may just store the UE's static capabilities. The UE may signal the temporary capability restriction request to the BS. As the UE changes its UE radio capabilities, it may participate in additional procedures 400 to inform the network. This can lead to repeated signaling of the UE Capability Information message, which can reduce network throughput.

Compared to LTE, UEs in 5G NR systems may support different and/or additional capabilities. As a result, the size of the UE capability information message (e.g., in procedure 400) is further expected to significantly increase in size (e.g., relative to LTE). Thus, it may be desirable to reduce the size of the UE capability signaling, due in part, to the significant size of the UE radio capability information.

There may be drawbacks, however, to certain techniques for reducing the UE capability signaling. For example, some techniques may define an identifier (associated with a set of UE radio capabilities) by computing (using) a hash function over the set of UE radio capabilities. However, using a hash function to determine a capability identifier may not be viable for 5G networks due to extra complexities introduced in cases of collisions. As a reference example, it may be possible for the hash function to produce a same identifier for two different UE sets of capabilities. In such situations, the UE and/or network may have to send additional signaling in order to resolve the collision.

Additionally, some certain techniques may define an identifier (associated with a set of UE radio capabilities) based on a permanent device ID, such as the international mobile equipment identity (IMEI). As a reference example, the identifier may be based on the IMEI software version (IMEI-SV), which includes the type allocation code (TAC) and software version number (SVN). However, there may be situations in which different TAC+SVN identifiers indicate the same UE radio capabilities. Thus, using identifiers based on permanent device IDs may reduce the gain of using identifiers to associate with different sets of UE radio capabilities. Moreover, using identifiers based on permanent device IDs may reduce the flexibility of the UE capability signaling in the network, e.g., by reducing (or preventing) the ability of the network and/or the device to change identifiers associated with a given device. Accordingly, it may be desirable to provide improved techniques for optimizing UE radio capability signaling in a network.

Aspects presented herein provide techniques for using a (new) capability identifier (e.g., not based on a hash function or tied to a permanent device ID) to identify the UE radio capabilities which the network can store along with the capabilities. By allowing the UE to report the capability identifier (e.g., during a registration procedure), as opposed to the actual UE radio capabilities, the techniques presented herein can significantly reduce the size of the UE capability signaling in the network.

In some aspects, the capability identifier may be a standardized capability identifier assigned by an administrative body of a standard, administrative body for a group of mobile network operators, etc. For example, original equipment manufacturers (OEMs) may register their devices' capabilities with an administrative body, such as the Global System for Mobile Communications Association (GSMA). The administrative body may assign the OEMs with a capability identifier for each group of devices having a corresponding (same) set of capabilities. The OEMs may then specify the devices' capabilities with an associated capability identifier, which mobile network operators can retrieve out of band into their local operations, administration and maintenance (OAM). Standardized capability identifiers may not be unique per public land mobility network (PLMN), but may be globally unique.

To manage standardized capability identifiers, there may be a "device settings database," where operators can specify their device (UE) radio capabilities and receive an associated capability identifier. A similar database can be used where OEMs specify the capabilities with an associated capability identifier, and operators can retrieve the capability identifier out of band into their local OAM.

In some aspects, the capability identifier may be a capability identifier specific to a mobile network operator. For example, the capability identifier can be preconfigured by operators as part of device certification or assigned by the operator (e.g., serving operator network) the first time that any UE reports capabilities on the network. Non-standardized (e.g., operator specific) capability identifiers may be unique per PLMN.

In some aspects, the capability identifier may be a capability identifier that is specific to a UE manufacturer. For example, the capability identifier can be assigned to a given type of UE by the manufacturer of the UE.

In some aspects, a network (e.g., 5G network) may support different types of capability identifiers, e.g., the standardized capability identifier, the manufacturer specific capability identifier, and/or the operator specific capability identifier. For example, in some cases, a first one or more of the types of capability identifiers may be considered as mandatory, while a second one or more other types of capability identifiers may be considered as optional. In general, at least one of the standardized capability identifier, the manufacturer specific capability identifier, or the operator specific capability identifier may be considered as optional or mandatory.

In some aspects, the capability identifier (e.g., standardized, manufacturer-specific, and/or operator specific) may be semi-statically associated with a UE. Since a UE may have certain features upgraded (e.g., due to a new software (SW) release), allowing the capability identifier to be semi-statically defined (and not associated with a permanent device ID such as IMEI) may provide a more flexible approach to signaling UE radio capabilities in the network. In some aspects, the network may also choose to remap a capability identifier of one type (e.g., standardized capability identifier) to another type (e.g., an operator specific capability identifier, manufacturer-specific capability identifier), e.g., as part of OAM procedures.

In general, however, the network and/or the UE may change the capability identifier associated with a set of UE radio capabilities. For example, the UE may be configured to change the capability identifier due to a SW upgrade enabling new capabilities on the device side. Similarly, the network may be configured to change the capability identifier due to remapping (of UE radio capabilities) or OAM procedures in the network side.

In some aspects, the UE may determine and/or report a particular capability identifier (associated with a set of UE radio capabilities) based on network capabilities requested by the UE. For example, the UE may be configured with multiple capability identifiers, each associated with a (different) set of UE radio capabilities. The UE may choose to reveal a certain set of UE radio capabilities based on the type of network the UE is attempting to use. For example, if the UE is attempting to connect to a data centric network, the UE may report the capability identifier that is associated with UE radio capabilities relevant to data centric networks. In some cases, the selection of the capability identifier may be based on capabilities of the particular 5G network slice requested by the UE.

Note that, in some cases, a first set of UE radio capabilities associated with a first capability identifier may be entirely different from a second set of UE radio capabilities associated with a second capability identifier. In some cases, a first set of UE radio capabilities associated with a first capability identifier may include some UE radio capabilities that overlap with some UE radio capabilities in a second set of UE radio capabilities associated with a second capability identifier.

In LTE, the MME may store the UE radio capabilities that are forwarded by the eNB in the S1-AP: UE CAPABILITY INFO INDICATION message. When a UE establishes a connection, the MME may include the last received UE radio capabilities as part of the S1-AP: INITIAL CONTEXT SETUP REQUEST message sent to the eNB. Additionally, during handover preparation, the source RAN node may transfer both the UE source RAT capabilities and the target RAT capabilities to the target RAN node, in order to minimize interruptions. UE radio capabilities may not be transferred during inter-MME idle mode mobility and/or mobility to/from GPRS.

There may be some situations in which a UE arrives at a 5G core network via an evolved packet core (EPC) (or 4G core network), LTE RAN node, etc. Thus, in some aspects, to enable compatibility (and inter-RAT mobility) with EPC, the procedure for UE capability retrieval in NR may be designed to co-exist with the UE capability enquiry procedure in LTE. In some aspects, to maintain backwards compatibility to LTE/EPS (and potentially NR Rel-15 in case of roaming), the UE radio capabilities and capability identifiers may be stored in the AMF and provided to the RAN when the UE moves to connected mode as part of the UE context. In some aspects, further optimizations in UE capability signaling may be achieved if capabilities are stored in the RAN. For example, the core network node may provide only the capability identifier (as opposed to the actual UE radio capabilities) to the RAN as part of the INITIAL CONTEXT SETUP REQUEST to reduce S1 signaling.

Figure 5:
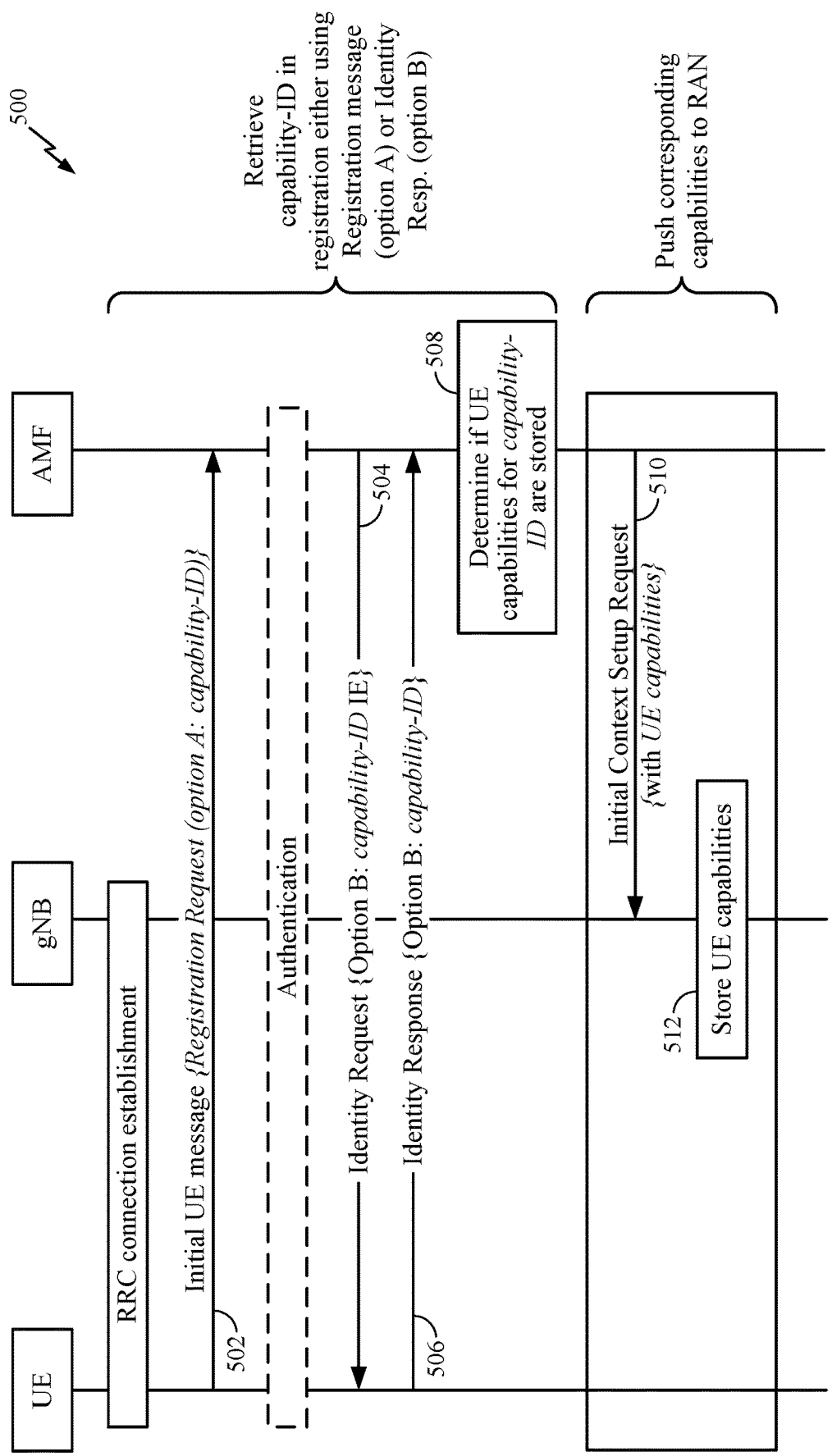
FIGS. 5-6 illustrate example call flows for UE capability signaling procedures, in accordance with certain aspects of the present disclosure.
Figure 6:
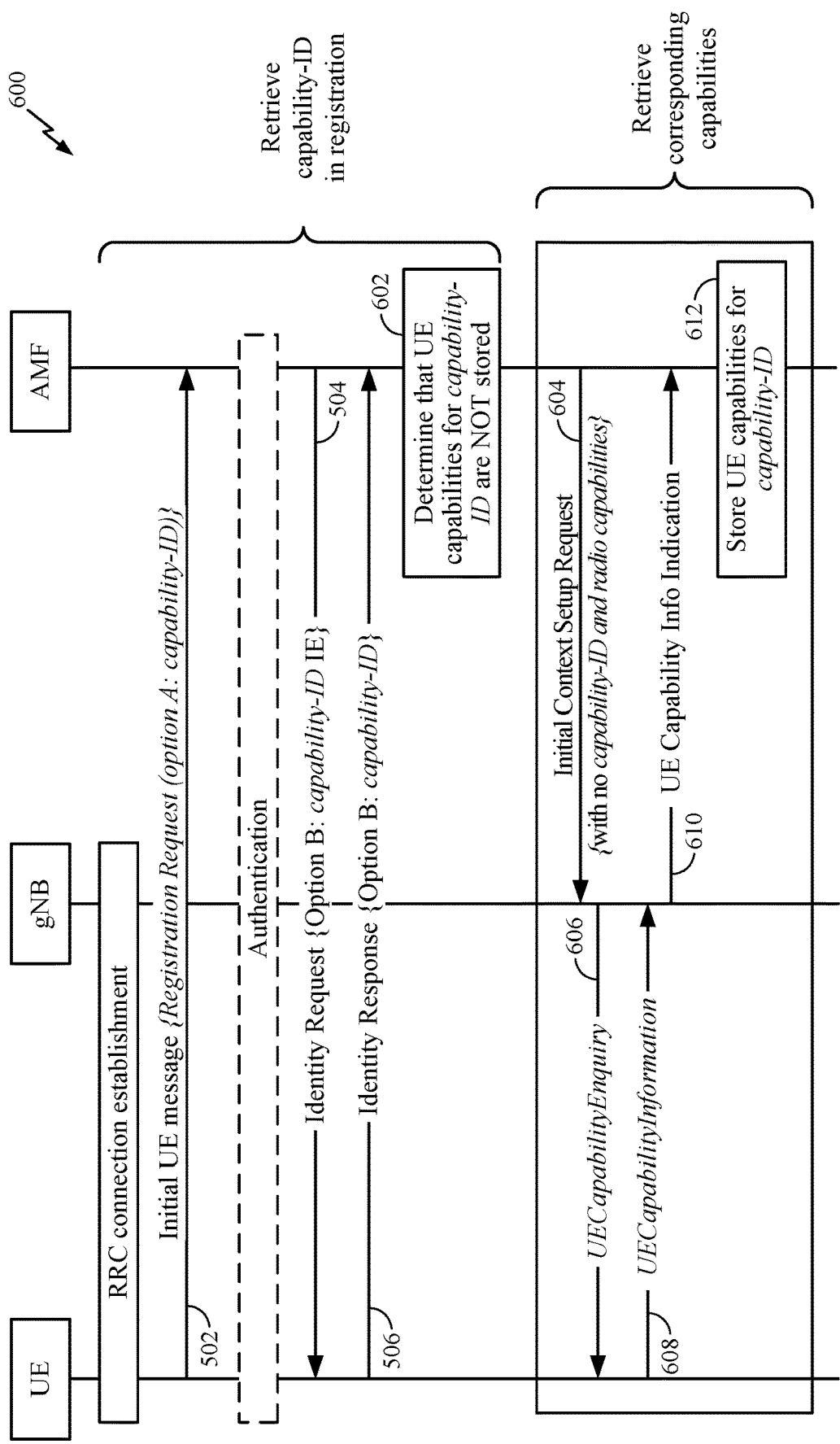

FIGS. 5-6 illustrate example respective call flows 500, 600 for UE capability signaling procedures based on the capability identifiers described herein, in accordance with various aspects of the present disclosure. Note that while FIGS. 5-6 illustrate UE capability signaling procedures for a 5G system, the techniques described herein may also be applied to EPS (e.g., LTE/EPC). For example, the gNB and AMF entities (for a 5G system) in FIGS. 5-6 may be interchangeable with eNB and MME (for EPS), respectively.

FIG. 5, in particular, depicts a call flow 500 where the UE provides a capability identifier as part of the registration procedure for the case where the network has the corresponding UE radio capabilities (e.g., stored in a database), in accordance with certain aspects of the present disclosure. During the registration procedure, the UE may send the capability identifier (associated with a particular set of UE radio capabilities) via a NAS message to the AMF. The NAS message may include a Registration message (option A) or an Identity Response message (option B).

In option A, the UE (at 502) may send a Registration message that includes the capability identifier, e.g., as part of RRC connection establishment. The gNB may encapsulate the Registration message into a container (e.g., Initial UE message) (but not parse the NAS—Registration message) and send the Initial UE message to the AMF. In option B, the AMF (at 504) may request, via an Identity Request message, the capability identifier, and the UE (at 506) may return the capability identifier in an Identity Response message.

Once the capability identifier is received, the AMF (at 508) may determine if UE radio capabilities associated with the capability identifier are stored in the core network. Note, that the UE radio capabilities may be stored in the AMF, or elsewhere in the core network (e.g., a database). When determining whether the UE radio capabilities have been stored, the AMF may perform a hash function on different sets of UE radio capabilities (associated with different capability identifiers) that are stored in the database, and determine if the resulting hash occurs in a distributed hash table in the database. If the resulting hash is present, the AMF may determine that the UE radio capabilities associated with the capability identifier have been stored. Otherwise, the AMF may determine that the corresponding UE radio capabilities have not been stored.

As shown in the reference example in FIG. 5, the AMF determines (at 508) that the corresponding UE radio capabilities for the capability identifier are stored, and retrieves the corresponding UE radio capabilities. The AMF then pushes the corresponding UE radio capabilities to the RAN. For example, the AMF (at 510) sends an INITIAL CONTEXT SETUP REQUEST with the UE radio capabilities to the gNB. The gNB (at 512) then stores the UE radio capabilities. Although not shown, in some aspects, the AMF may push the corresponding UE radio capabilities to the RAN by sending the INITIAL CONTEXT SETUP REQUEST with the capability identifier (e.g., instead of the actual UE radio capabilities), assuming the UE radio capabilities have also been stored in the RAN (e.g., at the gNB, in a database, etc.).

FIG. 6 depicts a call flow 600 where (1) the UE does not provide a capability identifier as part of the registration procedure or (2) the network does not have the corresponding UE radio capabilities (e.g., stored in a database), in accordance with certain aspects of the present disclosure.

As shown, at 602, the AMF determines that it does not have UE radio capabilities associated with a device (UE) that is attempting the registration procedure. As noted, this can be due to either (1) the UE not providing a capability identifier to the AMF in option A (502) or option B (504 and 506); or (2) determining that the corresponding UE radio capabilities have not been stored for a capability identifier received in option A (502) or option B (504 and 506).

Once the AMF determines that corresponding UE radio capabilities are not available, the AMF may interact with the gNB and/or UE to retrieve the corresponding UE radio capabilities. In one aspect, the AMF triggers a procedure to retrieve the corresponding UE radio capabilities from the UE. As shown, the AMF (at 604) sends an INITIAL CONTEXT SETUP REQUEST (without a capability identifier and without UE radio capabilities) to the gNB. The receipt of this message triggers the gNB to perform a UE capability enquiry procedure with the UE. The UE capability enquiry procedure may be similar to the procedure 400 depicted in FIG. 4. In this procedure, the gNB (at 606) sends a UE capability enquiry message requesting the UE radio capabilities from the UE, and the UE returns (at 608) the requested UE radio capabilities in a UE capability information message. The gNB then sends (at 610) the received UE capability information to the AMF.

At 612, the AMF can assign a capability identifier for the received UE radio capabilities, and store the corresponding UE radio capabilities with an indication of the assigned capability identifier. In some cases, if the AMF received a capability identifier but was unable to locate corresponding UE radio capabilities, the AMF can assign the received capability identifier to the UE radio capabilities received from the gNB. In this manner, if the AMF receives the same capability identifier in a subsequent registration procedure (with the same or different UE), the AMF can locate the corresponding UE radio capabilities and provide them to the gNB, e.g., using similar procedures described in FIG. 5.

As noted above, aspects presented herein enable the UE and/or network node to change/update capability identifiers for a given set of UE radio capabilities.

For example, the UE capability reporting may initially include possible preconfigured capability identifiers as part of an initial registration procedure. If the UE is not configured with a capability identifier, it may not report any capability identifier(s) at initial registration and may wait for one to be allocated by the AMF when the UE radio capabilities are successfully retrieved.

In some aspects, the UE may be configured to support multiple capability identifiers simultaneously. However, the UE may be configured to use a single capability identifier at a time. That is, the UE may be configured to support multiple capability identifiers (where each capability identifier is associated with a set of UE radio capabilities) and select a particular capability identifier with each connection establishment. For example, the selected capability identifier may be associated with one or more UE attributes, such as a voice centric or data centric profile, a change in UE radio capabilities after an OTA SW upgrade, a particular geographical region or area frequently visited by the UE (e.g., the UE may switch between two capability profiles optimized for two different regions), etc. In some cases, the capability identifiers may be common across several UEs, and thus, there may not be an increase in memory/resource usage in the network when such capability profiles are already saved in the network.

In some aspects, when the UE radio capabilities change, the UE can re-register the capabilities with the AMF, indicating to the AMF that the radio capabilities have changed. This process may trigger the AMF to delete any previously stored capabilities. Note that, in some cases, the UE may update the capability identifier (associated with radio capabilities) by performing a detach procedure and a re-attach procedure with an updated capability identifier. In some cases, the UE may update the capability identifier without performing a detach and re-attach procedure. In cases where the update procedure does not involve a re-attach procedure, the techniques presented herein enable the UE to simplify what is being communicated to the network. That is, since the UE may be aware that its frequently used profiles are saved in the network, the UE may just communicate the new capability identifier (instead of the actual updated capabilities). Additionally, in some cases, the UE can be configured to report multiple capability identifiers and the network may select which is the preferred profile to use based on the UE subscription and services active.

Figure 7:
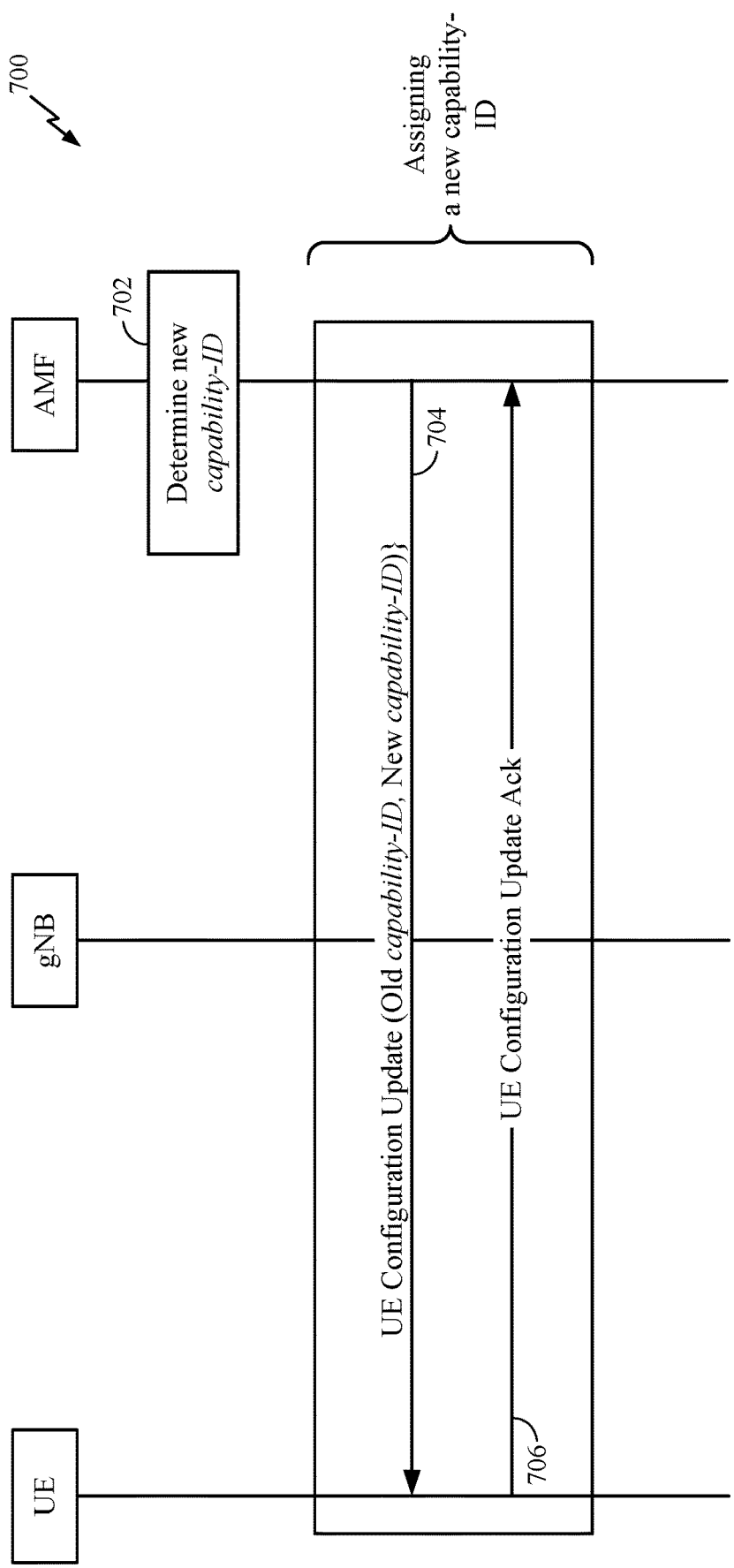
FIGS. 7-8 illustrate example call flows for modifying UE capability identifiers, in accordance with certain aspects of the present disclosure.
Figure 8:
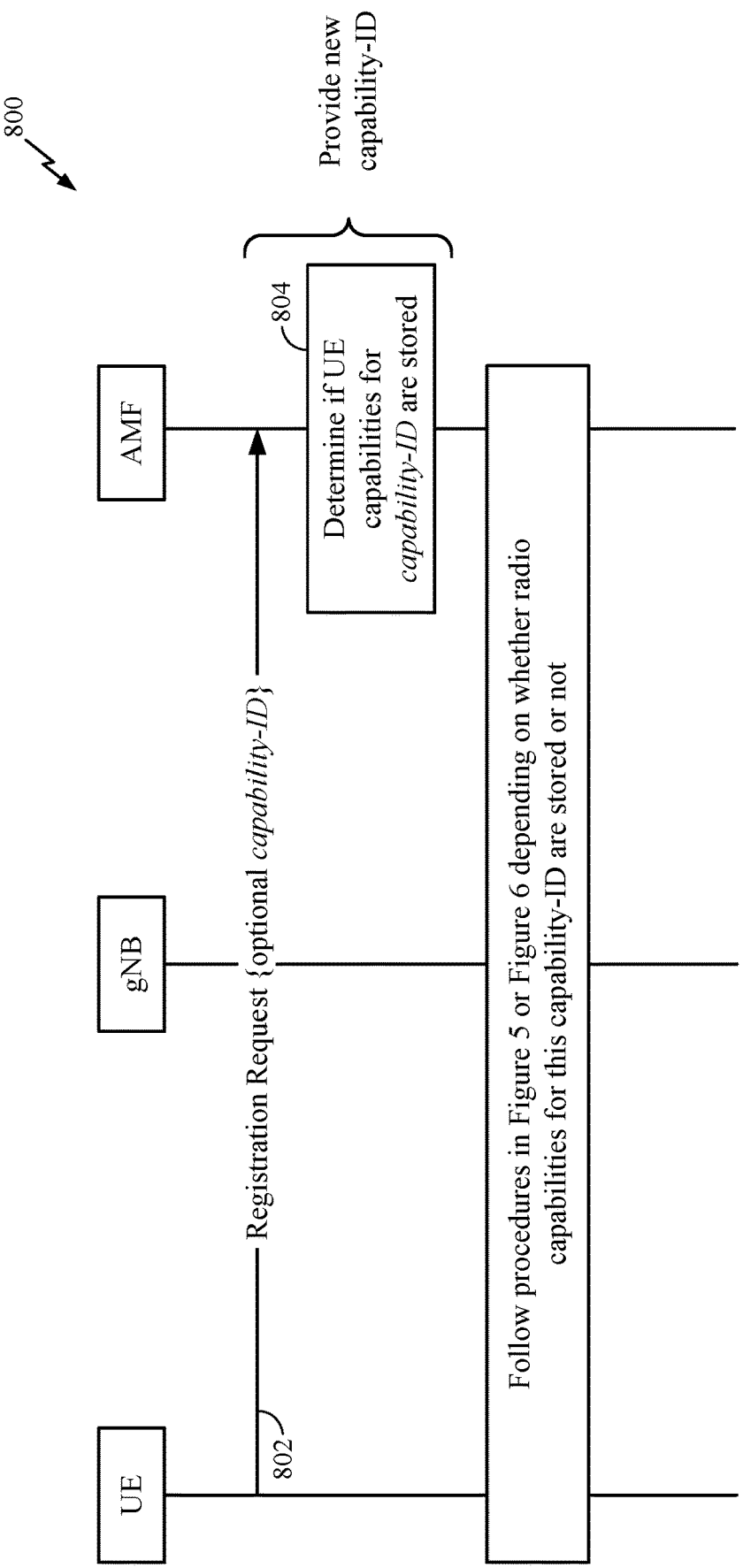

FIGS. 7-8 illustrate example respective call flows 700, 800 for modifying UE capability identifiers, in accordance with various aspects of the present disclosure. Note that while FIGS. 7-8 illustrate techniques for modifying UE capability identifiers for a 5G system, the techniques described herein may also be applied to EPS (e.g., LTE/EPC). For example, the gNB and AMF entities (for a 5G system) in FIGS. 7-8 may be interchangeable with eNB and MME (for EPS), respectively.

FIG. 7, in particular, depicts a call flow 700 where the network modifies the capability identifier for a given set of UE radio capabilities, in accordance with certain aspects of the present disclosure. As noted above, the AMF may modify (update) the capability identifier associated with an existing set of UE radio capabilities (e.g., due to remapping, OAM procedures, switching from a standardized identifier to a non-standardized identifier, etc.).

As shown, once the AMF determines (at 702) a new capability identifier, the AMF sends (at 704) a UE Configuration Update message that includes the old capability identifier and the new capability identifier. The UE sends (at 705) a UE Configuration Update Acknowledgment (e.g., indicating successful receipt of the UE Configuration Update message). The UE may then use the new capability identifier in subsequent registration procedures. Although not shown, in some aspects, the UE may send a message (e.g., negative Acknowledgement (NACK)) to the AMF indicating the UE Configuration Update message was not received. The NACK message may trigger the AMF to send another UE Configuration Update message.

FIG. 8 depicts a call flow 800 where the UE modifies the set of UE radio capabilities and the corresponding capability identifier, in accordance with certain aspects of the present disclosure. Note, this reference example may assume that detach/reattach is not used. In some aspects, however, the UE may perform a detach/reattach in order to modify a set of UE radio capabilities and the corresponding capability identifier.

As noted above, the UE may determine to update the capability identifier after receiving a new (or different) set of capabilities in a SW upgrade (which may not have a capability identifier). The UE may modify/update the capability identifier via a NAS message as part of the registration procedure. For example, as shown, the UE may send (at 802) the Registration Request message with the updated capability identifier. At 804, the AMF may determine if corresponding UE radio capabilities for the capability identifier are stored in the network, and follow procedures in FIG. 5 or FIG. 6 based on the determination.

Note that while FIGS. 5-8 describe various network operations from the perspective of the AMF, the gNB may be configured to perform same or similar operations as the AMF. For example, the UE may be configured to send the capability identifier to the gNB via a RRC message (e.g., as opposed to a NAS message). The gNB may perform similar procedures as the AMF to determine if corresponding UE radio capabilities have been stored for the capability identifier, and interact with the UE (e.g., in a capability enquiry procedure) to obtain the UE radio capabilities if it is determined that the corresponding UE radio capabilities have not been stored. On the other hand, if the UE radio capabilities have been stored, the gNB can retrieve the UE radio capabilities, and send an indication of the UE radio capabilities (e.g., the actual UE radio capabilities and/or the UE capability identifier) to the AMF.

Figure 9:
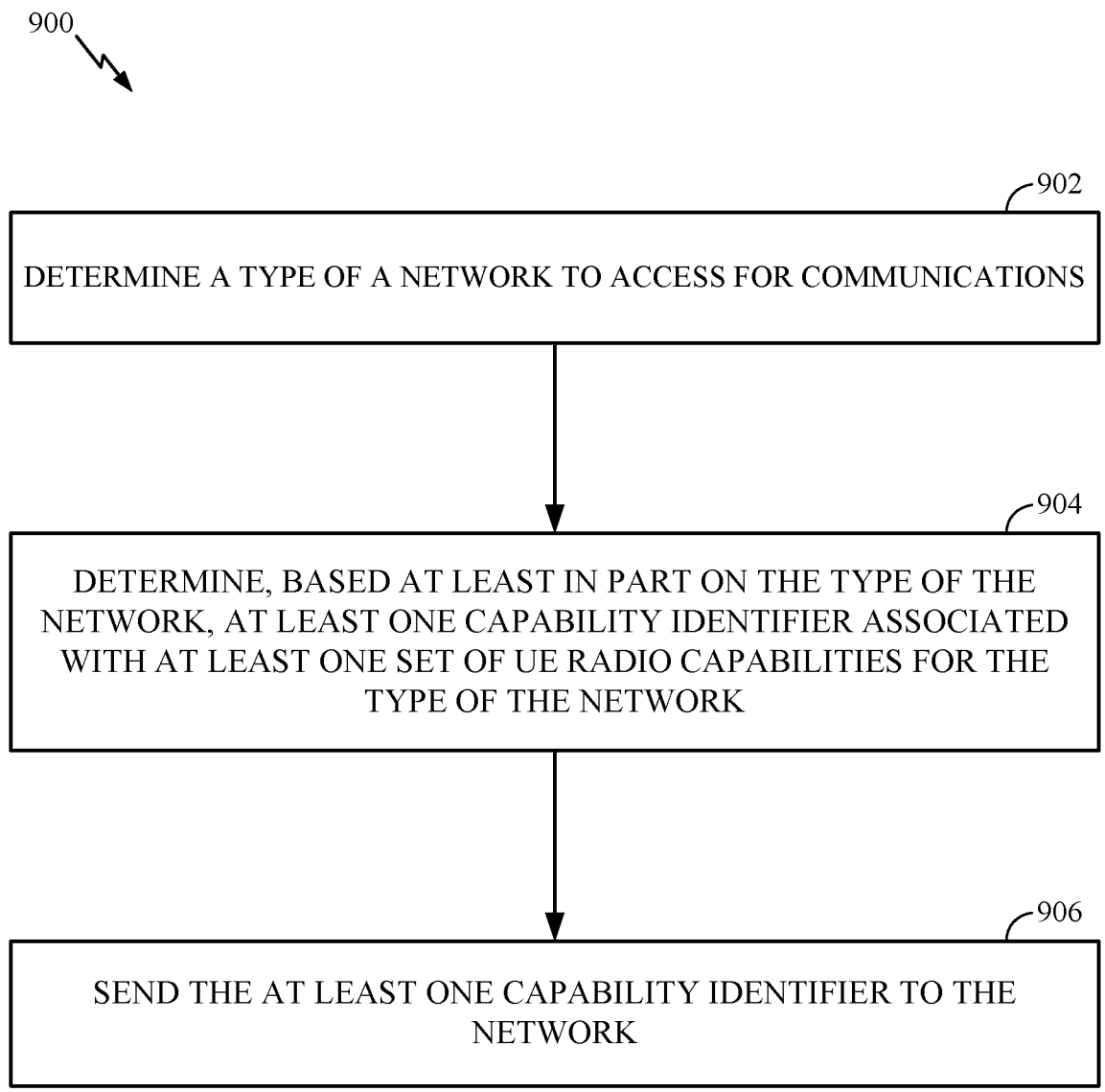
FIG. 9 illustrates example operations for wireless communications, for example, for optimizing UE radio capability signaling, in accordance with certain aspects of the present disclosure.

FIG. 9 illustrates example operations 900 for wireless communications, in accordance with aspects of the present disclosure. Operations 900 may be performed, for example, by a UE, such as UE 120 shown in FIG. 1. Operations 900 may be implemented as software components (e.g., capability configuration component 160) that are executed and run on one or more processors (e.g., processor 280 of FIG. 2). Further, the communicating (e.g., transmission and/or reception of signals) by the UE in operations 900 may be enabled, for example, by one or more antennas (e.g., antennas 252 of FIG. 2). In certain aspects, the communicating (e.g., transmission and/or reception of signals) by the UE may be implemented via a bus interface of one or more processors (e.g., processor 280) obtaining and/or outputting signals.

Operations 900 begin, at 902, where the UE determines a type of a network (e.g., RAN, core network, etc.) to access for communications. For example, the UE may determine to access RAN 304A/CN 306A and/or RAN 304B/CN 306B. The UE may determine the type of the network based on signaling received from the network, a predefined (or previous) configuration, cell/network that the UE is camping on, etc. In some aspects, determining the type of the network may include determining one or more capabilities supported by the network. For example, the network capabilities may include at least one of a type of duplexing (e.g., FDD, TDD, etc.) supported by the network, frequency band(s)/band combinations supported by the network, a type of traffic (e.g., voice centric, data centric, etc.) supported by the network, radio bearers supported by the network, etc.

At 904, the UE determines, based at least in part on the type of the network, at least one capability identifier associated with at least one set of UE radio capabilities for the type of the network. As noted, the UE may determine different types of capability identifiers. In one aspect, for example, the at least one capability identifier is an operator specific capability identifier assigned by a serving operator network. In one aspect, the at least one capability identifier is a standardized capability identifier assigned by an administrative body of a standard. In one aspect, the at least one capability identifier is a manufacturer specific capability identifier assigned by a UE manufacturer (e.g. manufacturer of the UE). In some aspects, for a given type of capability identifier (e.g., standardized, manufacturer-specific, operator-specific, etc.), the at least one capability identifier may be based on a software version of the UE and/or be semi-statically associated with the UE.

In some aspects, the UE (at 904) may determine a plurality of capability identifiers. Each capability identifier may be associated with a set of UE radio capabilities. In one aspect, at least one of the UE radio capabilities within a set of UE radio capabilities may differ from the UE radio capabilities within another set of UE radio capabilities. The UE (at 904) may determine the at least one capability identifier from the plurality of capability identifiers.

In some aspects, the UE (at 904) may determine the at least one capability identifier further based on one or more UE attributes. For example, as noted, the UE may support multiple capability identifiers. Each capability identifier may be associated with one or more UE attributes, including, e.g., a voice centric or data centric profile, a particular geographical region, a SW version, etc. The UE (at 904) may determine the at least one capability identifier based on the UE attribute(s).

At 906, the UE sends the at least one capability identifier to the network. In one aspect, the UE may send the at least one capability identifier during a registration procedure with the network. In one example, the UE may send the at least one capability identifier via a RRC message. In another example, the UE may send the at least one capability identifier via a NAS message (e.g., 502 in FIG. 5, 506 in FIG. 5). The NAS message may include a Registration message (e.g., 502 in FIG. 5) or an Identity Response message (e.g., 506 in FIG. 5).

In some aspects, after sending the at least one capability identifier at 906, the UE (as part of operations 900) may receive an updated capability identifier from the network (e.g., 704 in FIG. 7), where the updated capability identifier is associated with the at least one set of UE radio capabilities.

In some aspects, after sending the at least one capability identifier at 906, the UE (as part of operations 900) may determine at least another capability identifier (e.g., 802 in FIG. 8). The other capability identifier(s) may be associated with the at least one set of UE radio capabilities or with a different set of UE radio capabilities. The UE may send the other capability identifier(s) to the network (e.g., 802 in FIG. 8, 502 in FIG. 5, 506 in FIG. 5). The UE may send the other capability identifier(s) as part of another registration procedure with the network or without performing another registration procedure with the network (e.g., without performing network detach/reattach).

Figure 10:
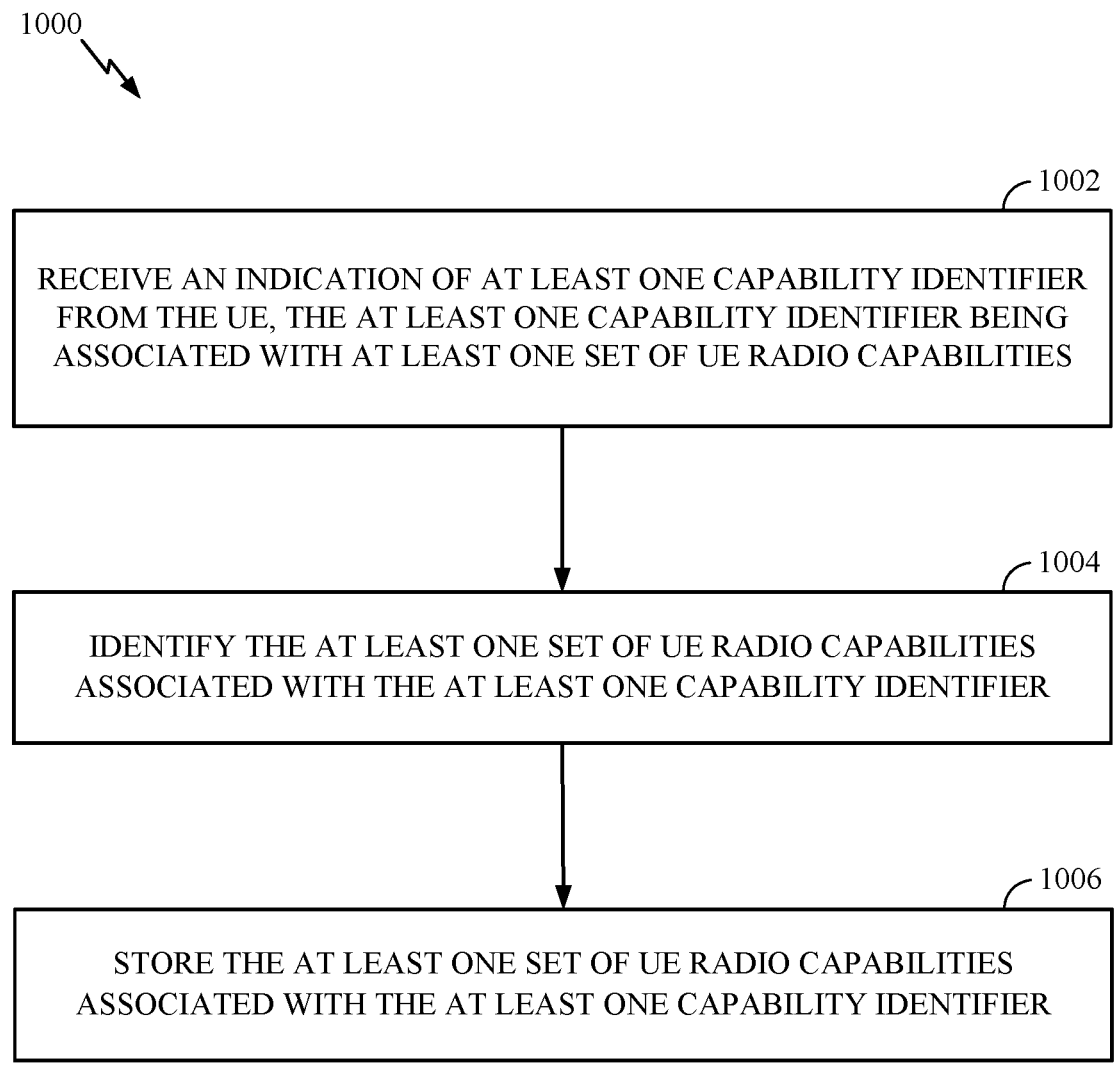
FIG. 10 illustrates example operations for wireless communications, for example, for optimizing UE radio capability signaling, in accordance with certain aspects of the present disclosure.

FIG. 10 illustrates example operations 1000 for wireless communications, in accordance with aspects of the present disclosure. Operations 1000 may be performed by a network node/entity, such as a gNB/eNB (e.g., BS 110 shown in FIG. 1), AMF, MME, etc. Operations 1000 may be implemented as software components (e.g., capability configuration component 170) that are executed and run on one or more processors (e.g., processor 240 of FIG. 2). Further, the communicating (e.g., transmission and/or reception of signals) by the network node in operations 1000 may be enabled, for example, by one or more antennas (e.g., antennas 234 of FIG. 2). In certain aspects, the communicating (e.g., transmission and/or reception of signals) by the network node may be implemented via a bus interface of one or more processors (e.g., processor 240) obtaining and/or outputting signals. Some of the operations 1000 may be complementary to operations 900 performed by the UE, e.g., for optimizing UE radio capability signaling.

Operations 1000 begin, at 1002, where the network node receives an indication of at least one capability identifier from the UE (e.g., 502 in FIG. 5, 506 in FIG. 5). In one aspect, the at least one capability identifier may be received during a registration procedure with the UE. The at least one capability identifier is associated with at least one set of UE radio capabilities. The indication of the at least one capability identifier may be received via a RRC message or a NAS message (e.g., 502 in FIG. 5, 506 in FIG. 5). The NAS message may include a Registration message or an Identity Response message.

At 1004, the network node identifies the at least one set of UE radio capabilities associated with the at least one capability identifier. In one aspect, the UE (at 1004) may identify the at least one set of UE radio capabilities by determining whether the at least one set of UE radio capabilities have been stored in a network and interacting with at least one of the UE or another network node based on the determination (e.g., 508 in FIG. 5, 602 in FIG. 6). At 1006, the network node stores the at least one set of UE radio capabilities associated with the at least one capability identifier (e.g., 512 in FIG. 5, 612 in FIG. 6).

In some aspects, the network node (at 1004) may interact with at least one of the UE or the other network node by retrieving the at least one set of UE radio capabilities from the UE if the determination is that the at least one set of UE radio capabilities have not been stored in the network. For example, the network node may send a UE capability enquiry message to the UE (e.g., 606 in FIG. 6) and receive, in response to the UE capability enquiry message, an indication of the at least one set of UE radio capabilities from the UE (e.g., 608 in FIG. 6). In these aspects, the network node may be a gNB or eNB.

In some aspects, the network node (at 1004) may interact with at least one of the UE or the other network node by retrieving the at least one set of UE radio capabilities if the network node determines that the at least one set of UE radio capabilities have been stored in the network (e.g., 508 in FIG. 5), and sending a message (e.g., an initial context setup message) that includes the at least one set of UE radio capabilities to the other network node (e.g., 510 in FIG. 5). In these aspects, the network node may be an AMF/MME and the other network node may be a gNB/eNB.

In some aspects, the network node (at 1004) may interact with at least one of the UE or the other network node by retrieving the at least one set of UE radio capabilities if the network node determines that the at least one set of UE radio capabilities have been stored in the network, and sending a message that includes the at least one set of UE radio capabilities to the other network node. In these aspects, the network node may be a gNB/eNB and the other network node may be an AMF/MME.

In some aspects, the network node (at 1004) may interact with at least one of the UE or the other network node by sending a message (e.g., an initial context setup message) that does not include the at least one set of UE radio capabilities to the other network node if the determination is that the at least one set of UE radio capabilities have not been stored in the network (e.g., 602 and 604 in FIG. 6). After sending the message, the network node may receive an indication of the at least one set of UE radio capabilities from the other network node (e.g., 610 in FIG. 6). In these aspects, the network node may be an AMF/MME and the other network node may be a gNB/eNB.

In some aspects, the network node (at 1004) may interact with at least one of the UE or the other network node by sending a message (e.g., to the UE) requesting the UE radio capabilities (e.g., 606 in FIG. 6), if the determination is that the at least one set of UE radio capabilities have not been stored in the network. After sending the message, the network node may receive an indication of the at least one set of UE radio capabilities from the UE (e.g., 608 in FIG. 6) and send an indication of the at least one set of UE radio capabilities to the other network node (e.g., 610 in FIG. 6). In these aspects, the network node may be a gNB/eNB and the other network node may be an AMF/MME.

In some aspects, the network node (as part of operations 1000) may determine an updated capability identifier for the at least one set of UE radio capabilities (e.g., 702 in FIG. 7) and send an indication of the updated capability identifier to the UE (e.g., 704 in FIG. 7). Additionally, or alternatively, in some aspects, the network node (as part of operations 1000) may receive at least another capability identifier from the UE (e.g., 802 in FIG. 8). The other capability identifier may be associated with the at least one set of UE radio capabilities or may be associated with a different set of UE radio capabilities.

Figure 11:
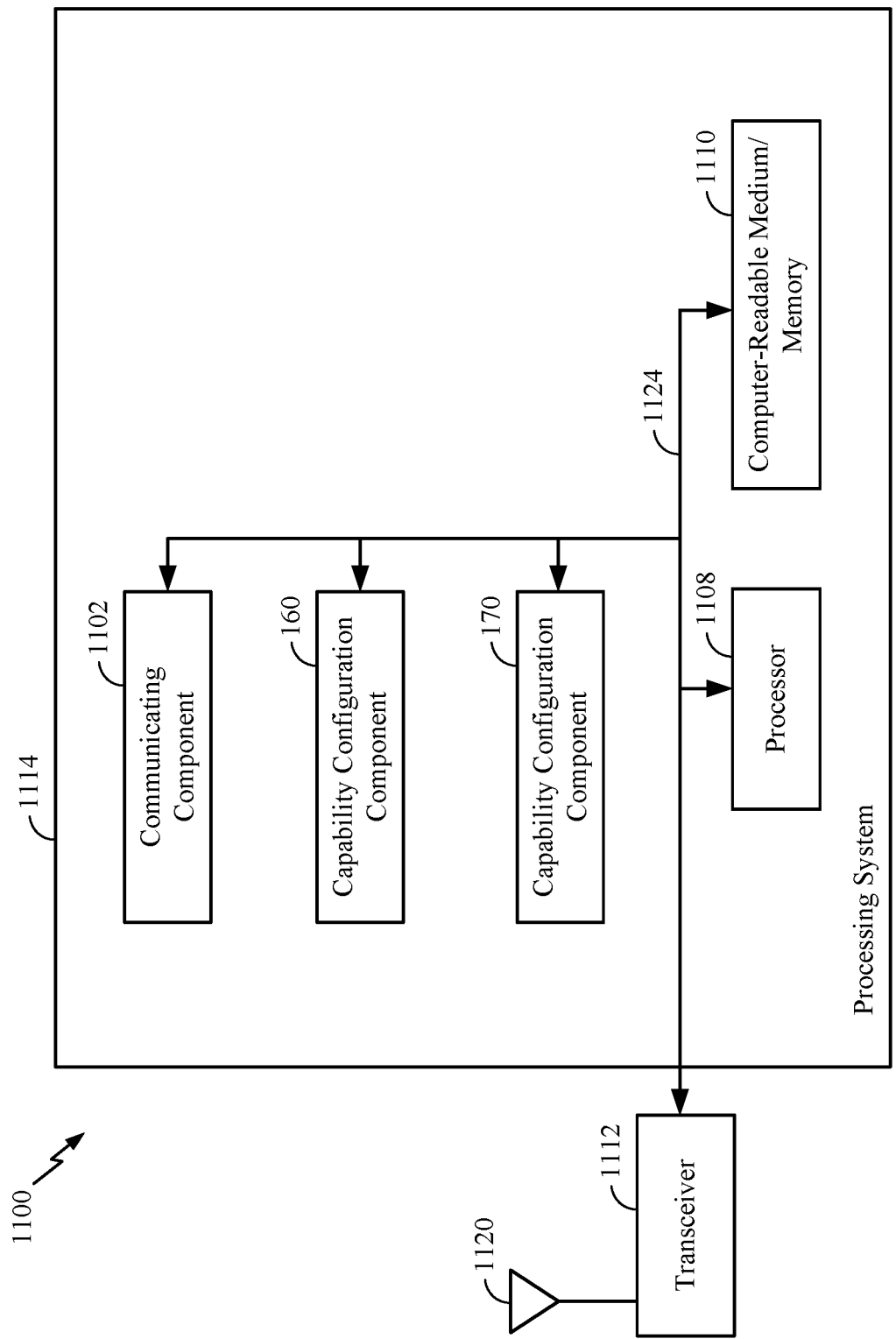
FIG. 11 illustrates a communications device that may include various components configured to perform operations for the techniques disclosed herein, in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIGS. 5-10. The communications device 1100 includes a processing system 1114 coupled to a transceiver 1112. The transceiver 1112 is configured to transmit and receive signals for the communications device 1100 via an antenna 1120, such as the various signal described herein. The processing system 1114 may be configured to perform processing functions for the communications device 1100, including processing signals received and/or to be transmitted by the communications device 1100.

The processing system 1114 includes a processor 1108 coupled to a computer-readable medium/memory 1110 via a bus 1124. In certain aspects, the computer-readable medium/memory 1110 is configured to store instructions that when executed by processor 1108, cause the processor 1108 to perform the operations illustrated in FIGS. 5-10 and/or other operations for performing the various techniques discussed herein.

In certain aspects, the processing system 1114 further includes a communicating component 1102 for performing the operations illustrated at 906 in FIG. 9, operations illustrated at 1002 in FIG. 10, and/or operations depicted in FIGS. 5-8. Additionally, the processing system 1114 includes a capability configuration component 160 for performing the operations illustrated at 902 and 904 in FIG. 9 and/or operations depicted in FIGS. 5-8. The processing system 1114 further includes a capability configuration component 170 for performing the operations illustrated at 1004 and 1006 in FIG. 10 and/or operations depicted in FIGS. 5-8. The communicating component 1102 and capability configuration components 160, 170 may be coupled to the processor 1108 via bus 1124. In certain aspects, the communicating component 1102 and capability configuration components 160, 170 may be hardware circuits. In certain aspects, the communicating component 1102 and capability configuration components 160, 170 may be software components that are executed and run on processor 1108.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, the instructions may include instructions for performing the operations described herein and illustrated in FIGS. 5-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), the method comprising:
    determining a type of a network to access for communications;
    determining, based at least in part on the type of the network, at least one capability identifier associated with at least one set of UE radio capabilities for the type of the network;
    sending the at least one capability identifier to the network; and
    after sending the at least one capability identifier, receiving an updated capability identifier from the network for the at least one set of UE radio capabilities.

2. The method of claim 1, wherein determining the type of the network comprises determining one or more capabilities supported by the network.

3. The method of claim 2, wherein the one or more capabilities comprises at least one of a type of duplexing supported by the network, one or more bands supported by the network, or a type of traffic supported by the network.

4. The method of claim 1, wherein:
    the at least one capability identifier is determined further based on one or more attributes of the UE; and
    the one or more attributes of the UE comprises at least one of a type of traffic to be exchanged with the network, a geographical region associated with the UE, or a software version of the UE.

5. The method of claim 1, further comprising determining a plurality of capability identifiers, wherein:
    each capability identifier is associated with a set of UE radio capabilities; and
    the at least one capability identifier is determined from the plurality of capability identifiers.

6. The method of claim 1, wherein the at least one capability identifier is an operator specific capability identifier assigned by a serving operator network.

7. The method of claim 1, wherein the at least one capability identifier is a manufacturer specific capability identifier assigned by a UE manufacturer.

8. The method of claim 1, wherein the at least one capability identifier is based on a software version of the UE.

9. The method of claim 1, wherein the at least one capability identifier is semi-statically associated with the UE.

10. The method of claim 1, wherein the at least one capability identifier is sent via a radio resource control (RRC) message or a non-access stratum (NAS) message during a registration procedure with the network.

11. The method of claim 10, wherein the NAS message comprises a Registration message or an Identity Response message.

12. The method of claim 1, further comprising:
    after sending the at least one capability identifier, determining at least another capability identifier with a different set of UE radio capabilities; and
    sending the at least other capability identifier to the network.

13. An apparatus for wireless communications, comprising:
    at least one processor configured to:
        determine a type of a network to access for communications; and
        determine, based at least in part on the type of the network, at least one capability identifier associated with at least one set of user equipment (UE) radio capabilities for the type of the network;
    a transmitter configured to transmit the at least one capability identifier to the network;
    a receiver configured to receive an updated capability identifier from the network for the at least one set of UE radio capabilities, after the at least one capability identifier has been transmitted; and
    a memory coupled to the at least one processor.

14. A method for wireless communications by a network node, the method comprising:
    receiving an indication of at least one capability identifier from a user equipment (UE), the at least one capability identifier being associated with at least one set of UE radio capabilities;
    identifying the at least one set of UE radio capabilities associated with the at least one capability identifier;
    storing the at least one set of UE radio capabilities associated with the at least one capability identifier;
    determining an updated capability identifier for the at least one set of UE radio capabilities; and
    sending an indication of the updated capability identifier to the UE.

15. The method of claim 14, wherein identifying the at least one set of UE radio capabilities comprises:
  determining whether the at least one set of UE radio capabilities have been stored in a network; and
  interacting with at least one of the UE or another network node based on the determination.

16. A method for wireless communications by a network node, the method comprising:
  receiving an indication of at least one capability identifier from a user equipment (UE), the at least one capability identifier being associated with at least one set of UE radio capabilities;
  identifying the at least one set of UE radio capabilities associated with the at least one capability identifier, comprising: (i) determining whether the at least one set of UE radio capabilities have been stored in a network and (ii) interacting with at least one of the UE or another network node based on the determination, comprising:
    retrieving the at least one set of UE radio capabilities if the determination is that the at least one set of UE radio capabilities have been stored in the network; and
    sending an initial context setup message comprising the at least one set of UE radio capabilities to the other network node; and
  storing the at least one set of UE radio capabilities associated with the at least one capability identifier.

17. The method of claim 16, wherein:
  the network node is an access and mobility function (AMF) and the other network node is a next generation base station (gNB); or
  the network node is a mobility management entity (MME) and the other network node is a base station (eNB).

18. A method for wireless communications by a network node, the method comprising:
  receiving an indication of at least one capability identifier from a user equipment (UE), the at least one capability identifier being associated with at least one set of UE radio capabilities;
  identifying the at least one set of UE radio capabilities associated with the at least one capability identifier, comprising: (i) determining whether the at least one set of UE radio capabilities have been stored in a network and (ii) interacting with at least one of the UE or another network node based on the determination, comprising:
    sending an initial context setup message that does not include the at least one set of UE radio capabilities to the other network node if the determination is that the at least one set of UE radio capabilities have not been stored in the network; and
    after sending the initial context setup message, receiving an indication of the at least one set of UE radio capabilities from the other network node; and
  storing the at least one set of UE radio capabilities associated with the at least one capability identifier.

19. The method of claim 15, wherein interacting with at least one of the UE or the other network node comprises retrieving the at least one set of UE radio capabilities from the UE if the determination is that the at least one set of UE radio capabilities have not been stored in the network.

20. The method of claim 19, wherein retrieving the at least one set of UE radio capabilities comprises:
  sending a UE capability enquiry message to the UE; and
  receiving, in response to the UE capability enquiry message, an indication of the at least one set of UE radio capabilities from the UE.

21. The method of claim 14, further comprising receiving at least another capability identifier from the UE, wherein the at least another capability identifier is associated with a different set of UE radio capabilities.

22. The method of claim 14, wherein the indication of the at least one capability identifier is received via a radio resource control (RRC) message or a non-access stratum (NAS) message during a registration procedure with the UE.

23. The method of claim 22, wherein the NAS message comprises a Registration message or an Identity Response message.

24. The method of claim 14, wherein the at least one capability identifier is a manufacturer specific capability identifier assigned by a UE manufacturer.

25. The method of claim 14, wherein the at least one capability identifier is an operator specific capability identifier assigned by a serving operator network.

26. The method of claim 14, wherein the at least one capability identifier is based on a software version of the UE.

27. The method of claim 14, wherein the at least one capability identifier is semi-statically associated with the UE.

28. An apparatus for wireless communications, comprising:
  a receiver configured to receive an indication of at least one capability identifier from a user equipment (UE), the at least one capability identifier being associated with at least one set of UE radio capabilities;
  at least one processor configured to:
    identify the at least one set of UE radio capabilities associated with the at least one capability identifier;
    store the at least one set of UE radio capabilities associated with the at least one capability identifier; and
    determine an updated capability identifier for the at least one set of UE radio capabilities;
  a transmitter configured to transmit an indication of the updated capability identifier to the UE; and
  a memory coupled to the at least one processor.

* * * * *